US007035392B2

(12) United States Patent
Rakotoarivelo et al.

(10) Patent No.: US 7,035,392 B2
(45) Date of Patent: Apr. 25, 2006

(54) UNIQUE REPOSITORY SERVER IN AN OPERATIONS AND MAINTENANCE CENTER FOR A TELECOMMUNICATIONS SYSTEM

(75) Inventors: Jarisoa Rakotoarivelo, Champigny-sur-Marne (FR); Yannick Beucher, Meudon (FR); Patrick Barré, Chaville (FR)

(73) Assignee: Evolium S.A.S., Paris (FR)

( * ) Notice: Subject to any disclaimer, the term of this patent is extended or adjusted under 35 U.S.C. 154(b) by 200 days.

(21) Appl. No.: 10/404,143

(22) Filed: Apr. 2, 2003

(65) Prior Publication Data

US 2003/0212685 A1    Nov. 13, 2003

(51) Int. Cl.
*H04Q 3/00*     (2006.01)
(52) U.S. Cl. .................................. 379/242; 379/221.01
(58) Field of Classification Search .............. 372/242, 372/221.01–221.06; 714/4
See application file for complete search history.

(56) References Cited

U.S. PATENT DOCUMENTS

| 6,230,281 | B1 | 5/2001 | Brodfuhrer et al. | |
| 6,360,106 | B1 | 3/2002 | Besson | |
| 6,442,608 | B1* | 8/2002 | Knight et al. | 709/225 |
| 6,654,910 | B1* | 11/2003 | Eibach et al. | 714/37 |
| 6,718,481 | B1* | 4/2004 | Fair | 714/4 |
| 2002/0126823 | A1* | 9/2002 | Kumar et al. | |
| 2002/0136386 | A1* | 9/2002 | Nerger | |

FOREIGN PATENT DOCUMENTS

| EP | 0367699 A2 | 5/1990 |
| EP | 0772319 A2 | 5/1997 |
| WO | WO 98/26614 | 6/1998 |
| WO | WO 98/26614 A2 | 6/1998 |

OTHER PUBLICATIONS

B. Ozden et al, "Scalable and non-intrusive load sharing in owner-based distributed systems", Parallel and Distributed Processing, 1993, Proceedings of the Fifth IEEE Symposium on Dallas, TX, USA, Dec. 1-4, 1993, Los Alamitos, CA, US, IEEE Comput. Soc. Dec. 1, 1993, pp. 690-699, XP010135567.
A. Bouloutas et al, "Clustering Schemes for Network Management", Networking in the Nineties, Bal Harbour, Apr. 7-199, 1991, Proceedings of the Annual Joint Conference of the Computer and Communications Societies (INFOCOM), NY, IEEE US, vol. 2 Conf. 10, Apr. 7, 1991, pp. 111-120, XP010042394.

* cited by examiner

*Primary Examiner*—William J. Deane, Jr.
(74) *Attorney, Agent, or Firm*—Sughrue Mion, PLLC

(57) ABSTRACT

The invention relates to an operations and maintenance center for a telecommunications system comprising:
server means 5 for storing of first information being indicative of network elements of the telecommunications system and of second information being indicative of assignments of network elements and resource managers 2,
information retrieval means 12 for generating third information being indicative of network elements being assigned to one of the resource managers.

8 Claims, 2 Drawing Sheets

UNIQUE REPOSITORY SERVER IN AN OPERATIONS AND MAINTENANCE CENTER FOR A TELECOMMUNICATIONS SYSTEM

The invention is based on a priority application EP 02 360 117.2 which is hereby incorporated by reference.

FIELD OF THE INVENTION

The present invention relates to the field of operations and maintenance of a telecommunications system, and more particularly to load balancing in a telecommunications system.

BACKGROUND AND PRIOR ART

Operation and maintenance centers (OMCs) are as such known from the prior art for a variety of telecommunications systems. For example the GSM mobile telecommunications system specifies an OMC.

International Patent Application No. WO-A-9826614 discloses a typical radio communication system with base stations, at least one base station controller, and an OMC at the network side. The base station contains transceivers which are connected to an antenna unit, as well as a base-station-related local operations and maintenance unit. In the base station, a control unit handles the selective switching of a transceiver means to a communication connection. The transceivers can be automatically controlled either by the base station controller, the network-side OMC, or by the base-station-related operations and maintenance unit, so that they are in an operative state or in a stop state, respectively.

U.S. Pat. No. 6,360,106 shows a base station for a radio communications system. A controller of the base station performs monitoring and organization of the transceivers. An OMC belongs to the mobile radio system, in which center a management of the configuration, the software, and the performance parameters, as well as the management of the arising errors is carried out. To this end, error messages and messages about operational and performance conditions of the components of the mobile radio system arrive in the OMC.

The main functionality of the OMC is to evaluate the data of the individual base stations such that a continuous radio-technical coverage is ensured over the entire extent of the mobile radio network and replacement and change over mechanisms are controlled for the failure of individual transceivers. This is called Configuration Management. In general one OMC can manage the entire mobile radio system or only subcomponents of the mobile radio system.

US statutory invention registration H 1,896 shows a network management system server and method for operation for a telecommunications system. The network management system integrates the functionality of an OMC.

A variety of OMCs is commercially available for different kinds of telecommunications systems such as GSM and UMTS. Typically an OMC provides a user interface to enable an operator to monitor network performance, capacity, security and configuration. The user interface serves to display network element state and parameter values, network over-views by category and network geography as well as object relationships.

The main function is configuration management. This enables an operator to access and modify network elements and parameters. The other functions of a typical OMC are fault management, performance management and security management.

Each function needs to operate on an individual or a set of network elements. Instead of directly addressing the network elements, mediation component called 'Resource managers' is usually required.

SUMMARY OF THE INVENTION

The present invention provides for an improved operation and maintenance center (OMC) and an improved method for operation and maintenance as well as for a corresponding computer program product.

In particular, the invention enables to operate and maintain a telecommunications system in a more efficient and flexible way. Further the present invention enables scalability of the telecommunications system.

These object are achieved by Operations and maintenance center for a telecommunications system comprising:
server means (5) for storing of first information being indicative of network elements of the telecommunications system and of second information being indicative of assignments of network elements and resource managers (2),
information retrieval means (12) for generating third information being indicative of network elements being assigned to one of the resource managers.

These objects are further achieved by a method for operations and maintenance of a telecommunications system, the method comprising the steps of:
storing of first information being indicative of network elements of the telecommunications system,
storing of second information being indicative of assignments of network elements and resource managers,
generating of third information being indicative of network elements being assigned to one of the resource managers.

These objects are further achieved by a computer program product for an operations and maintenance center of a telecommunications system, the computer program product comprising program means for storing of first information being indicative of network elements of the telecommunications system and for storing of second information being indicative of assignments of network elements and resource managers and further comprising data retrieval means for generating third information being indicative of network elements being assigned to one of the resource manager processes.

In accordance with a preferred embodiment of the invention a relational database is used to centrally store information concerning the registration of network elements of the telecommunications system as well as attributive information of these network elements.

In accordance with a preferred embodiment of the invention each of the network elements needs to be assigned to one of the resource managers. The information which ones of the network elements are assigned to which resource manager is retrievable from the relational database. Also the number of network elements which are assigned to a particular resource manager is retrievable from the relational database.

The storage of the registration information of all network elements and the assigned resource managers in a central relational database has a variety of advantages. For example this enables to dynamically assign network elements to resource managers. In one application the resource managers are realized by means of resource manager software processes.

In case such a resource manager process fails it needs to be restarted. When the resource manager process is restarted it is first registered with the operations maintenance center. Then the resource manager process requests a list of those network elements which are to be managed by that resource manager process.

In response a database query is performed in the relational database to extract the list of network elements which are assigned to that resource manager process. This list of network elements is then transmitted to the resource manager process such that the resource manager process can resume its service.

In another application an additional network element is to be added to the telecommunications system. For this purpose the additional network element needs to be declared via the user interface of the OMC. In response a search is performed for a resource manager process which has a relatively small number of assigned network elements.

In other words the OMC determines a resource manager process which has sufficient unused capacity to service the additional network element. This can be done by determining the number of network elements which are assigned to each one of the resource manager processes. One of the resource manager processes having the smallest number of network elements is selected and the additional network element is assigned to the selected resource manager process. The assignment of the additional network element to the selected resource manager process is also stored in the database.

The invention is particularly advantageous in that the storage of static lists of network elements for each resource manager can be avoided. In particular, the invention enables to replace complex processes of resynchronization which are required in the prior art in case of a system modification or system failure by a flexible and efficient scheme.

In accordance with a further preferred embodiment of the invention the OMC comprises a repository server. The repository server is the OMC component responsible for managing the network element lists and attributes. Preferably it uses the relational database to handle and store the network elements information.

In particular the repository server serves to notify all relevant system components (such as Configuration management component, fault management component and so on) when a change of a network element and/or a network element attribute is entered into the relational database. For example if an additional network element is assigned to one of the resource manager processes the repository server sends a corresponding notification to the resource manager process such that the resource manager process updates its local network element list.

It is a particular advantage of the present invention that a centralized repository of network element information and assigned resource manager processes enables an efficient and flexible synchronization of all relevant components and hence full scalability.

BRIEF DESCRIPTION OF THE DRAWINGS

In the following preferred embodiments of the invention will be described in greater detail by making reference to the drawings in which:

FIG. 1 shows a telecommunications system which has a variety of network elements (NE) 1. For example if the telecommunications system is a mobile telecommunications system according to the GSM standard typical network elements include base station controllers (BSCs) and base transceiver stations (BTSs). In the case of a telecommunications system in accordance with the UMTS standard typical network elements include Node Bs and radio network controllers (RNCs).

Figure 1:
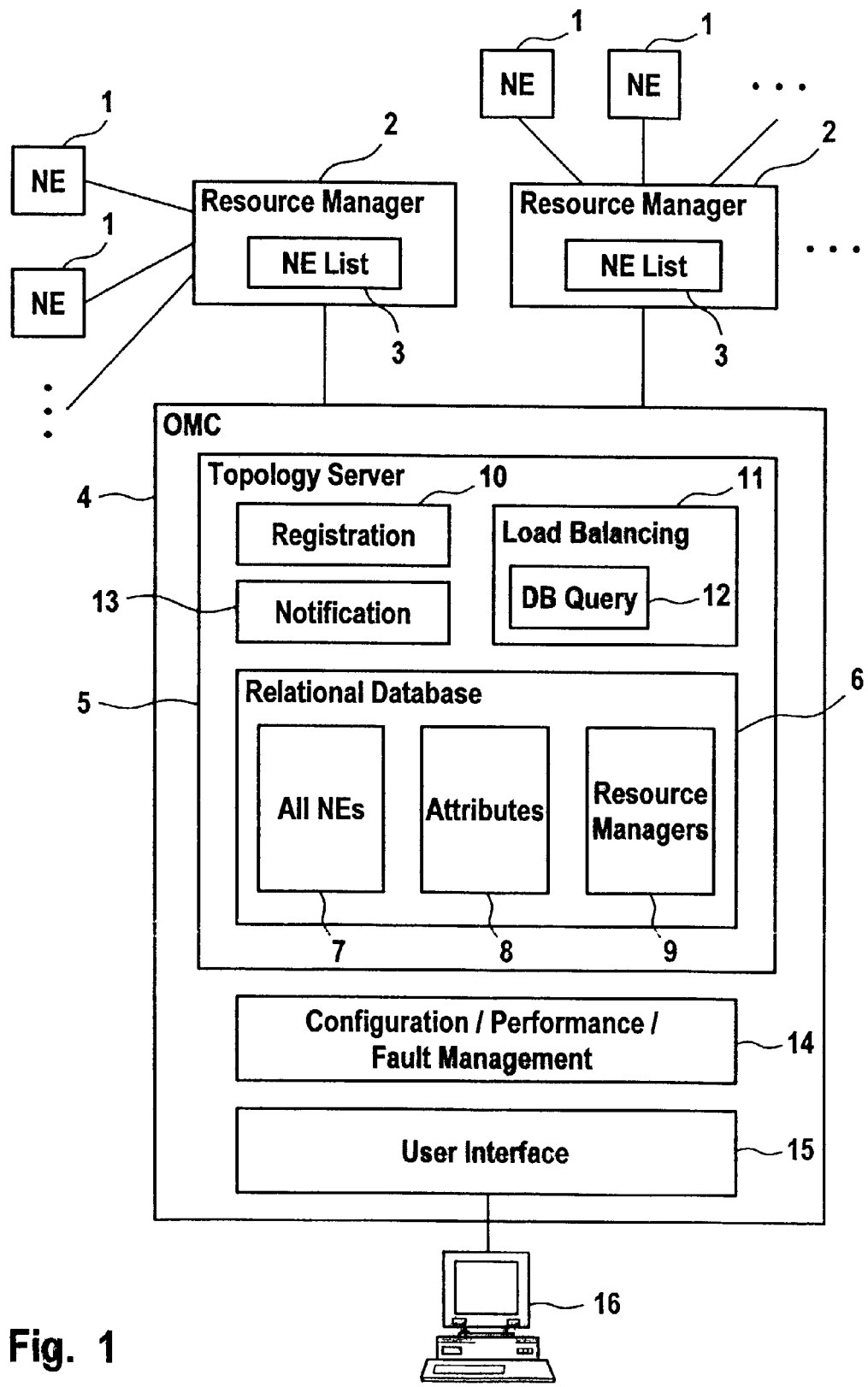
FIG. 1 is a block diagram of a telecommunications system comprising an embodiment of the OMC in accordance with the invention.

Each of the network elements 1 is assigned to a resource manager 2. The function of each one of the resource managers 2 of the telecommunications system is to manage the operation of its assigned network elements 1. For this purpose each one of the resource managers 2 has assigned a number of network elements 1.

The number of network elements 1 which are assigned to a resource manager 2 can vary between 0 and a maximum number N of network elements 1 a given resource manager 2 can handle. Typically a resource manager 2 is implemented as a software process which runs on a server computer. Usually the geographic distribution of the network elements 1 is more or less irrelevant as far as the assignment of a network element 1 to a given resource manager 2 is concerned.

Each of the resource managers 2 has a non-persistent storage 3 for storing of a network element list containing those network elements 1 which are assigned to that resource manager 2.

The resource managers 2 are coupled to the operations maintenance center (OMC) 4. The OMC 4 has a repository server 5 with a relational database 6. The relational database 6 serves to store information relating to all of the network elements 1 of the telecommunication system.

For example each of the network elements 1 is identified in the relational database 6 by its identifier and location and other attributive information concerning the network element 1 itself and/or its relationship to other network elements 1. Further the assignment of a network element 1 to one of the resource managers 2 is stored in the relational database 6. For this purpose the relational database 6 contains a number of relational tables such as table 7 for storage of the identifiers of all network elements 1, one or more tables 8 for storing of attributive information and table 9 for storage of available resource managers 2.

The repository server 5 has a registration program module 10 which serves to register/unregister the resource managers 2. For example in the case of a UNIX implementation, the registration program module 10 serves to register a resource manager process which has been "launched".

Further the repository server 5 has load balancing program module 11. The load balancing program module 11 serves to determine the number of network elements which are assigned to each one of the resource managers 2 in order to identify one of the resource managers 2 which has free capacity and to which an additional network element 1 can be assigned. The load balancing program module 11 has a database query module 12 which is used to perform database searches in the relational database 6 in order to identify the number of network elements 1 which are assigned to a given resource manager 2.

Further the repository server 5 has a notification module 13. The notification module 13 is prompted when new information is inputted into the relational database 6. In response the notification module 13 sends information to the relevant components of the telecommunication system, such as the resource managers 2 and the configuration management component 14, in order to provide an update to those components which are affected by the change of information in the relational database 6. For example the notification module 13 serves to provide an update of the network element list stored in a resource manager 2 which is affected by a changed assignment of network elements 1, for example if a new network element 1 is added.

Further the OMC 4 has configuration management, performance management and fault management components 14 which have a variety of purposes related to the OMC main functions such as fine tuning of radio access parameters, identification of faults in equipments and management of network performance and quality of service.

The OMC 4 has a user interface 15 to enable access to the OMC 4 from one or more client computers 16. From the client computer 16 a supervisor and/or a process administrator of the telecommunications system can access the OMC. For example a supervisor may want to declare an additional network element 1 which has been added to the telecommunications system or wants to remove one of the network elements 1.

In operation, when an additional resource manager 2 is launched the additional resource manager 2 is registered by means of the registration program module 10 and it requests its network element list of network elements 1 which are assigned to it. This invokes the database query module 12 which searches the relational database 6 for network elements 1 which are assigned to the newly launched resource manager 2.

The result is the network element list which is required by the newly launched resource manager 2. The OMC 4 provides this list to the newly launched resource manager 2 for a storage of this network element list in the corresponding storage 3 of that resource manager 2. This enables the newly launched resource manager 2 to start operation and to service its assigned network elements 1.

The above described procedure for handling the registration process of a resource manager 2 can be employed both for restarting a resource manager 2 after a failure or to add a completely new resource manager 2. This enables a quick and efficient recovery after a failure of a resource manager 2 occurred. Also this enables to add resource managers 2 as they are needed for scalability of the system.

Another application is the addition of a network element 1. To add a network element 1 to the telecommunications system the supervisor needs to declare the new network element 1 by entering the corresponding data via user interface 15 by means of its client computer 16.

The declaration of the additional network element 1 invokes the load balancing program module 11. The load balancing program module 11 determines the number of network elements 1 which are assigned to each one of the resource managers 2 by means of its database query module 12. The resource manager 2 having the lowest number of network elements 1 assigned to it is selected by the load balancing program module 11. The additional network element 1 is assigned to the selected resource manager 2 and this assignment is stored in the relational database 6.

Alternatively the load balancing program module 11 can use another criterion for selection of one of the resource managers 2. For example the load balancing program module 11 can search by means of its database query module 12 for a resource manager 2 which has free capacity to accommodate an additional network element 1. If such a resource manager 2 having sufficient resources available is identified the search can stop at this point.

The storage of the new assignment of the additional network element 1 to one of the resource managers 2 invokes the notification module 13 which provides a notification to the selected resource manager 2 in order to indicate the additional network element 1 which the selected resource manager 2 needs to service. In response the resource manager 2 updates its network element list correspondingly.

Likewise when a network element 1 is removed the corresponding information is also entered via the user interface 15 and stored in the relational database 6. This also invokes the notification module 13 in order to notify the affected resource manager 2 about this change.

Figure 2:
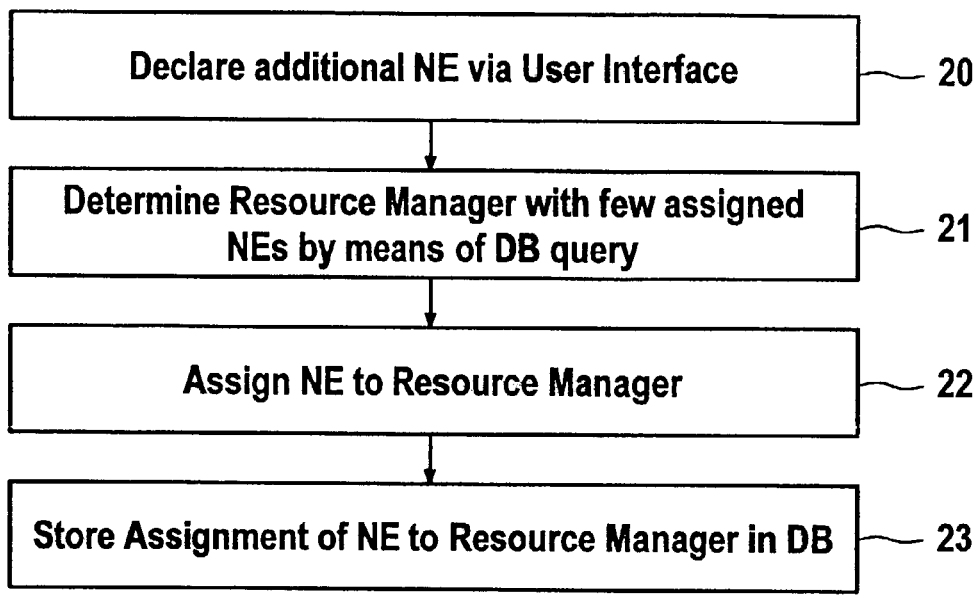
FIG. 2 is illustrative of a flow chart for adding a network element.

FIG. 2 shows a flow chart which is illustrative of the procedure for adding a network element.

In step 20 a supervisor inputs a declaration of an additional network element via the user interface of the OMC. A resource manager process is determined which is not fully loaded yet. In one implementation one of the active resource manager processes is selected which has relatively few assigned network elements. The number of network elements which are assigned to the resource manager processes is determined by performing a database query in a central information depository.

In step 22 the additional network element is assigned to the selected resource manager and the assignment is stored in the database in step 23.

Figure 3:
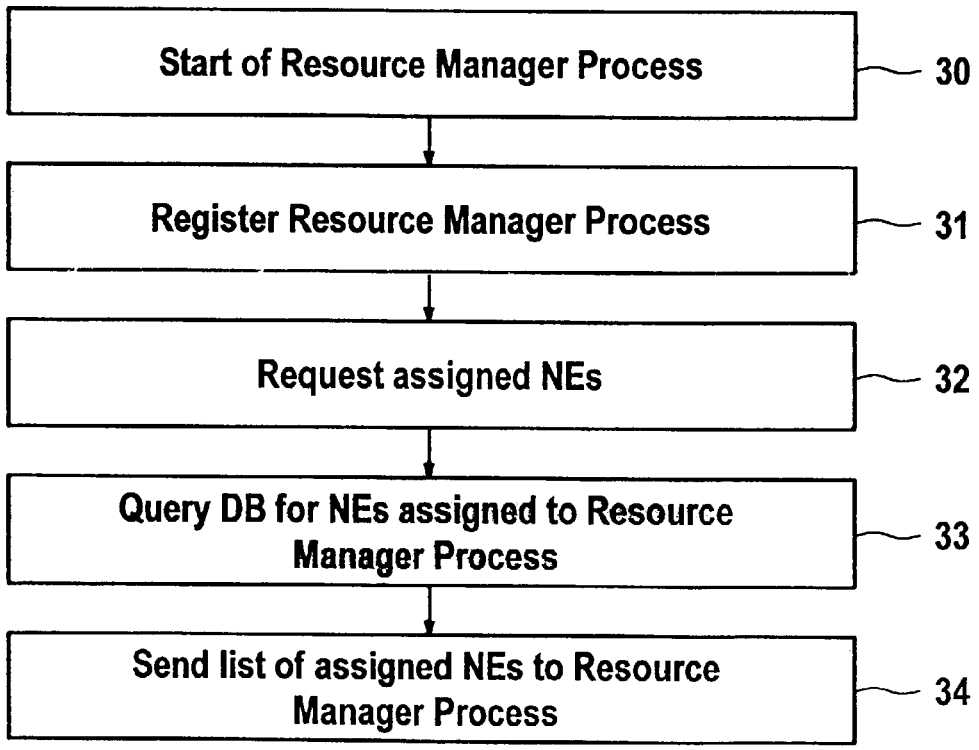
FIG. 3 is illustrative of a flow chart for starting (or restarting) a resource manager process.

FIG. 3 is illustrative of the launch or re-launch of a resource manager process. In step 30 the resource manager process is started or restarted. The resource manager process is registered with the OMC in step 31.

In step 32 the newly registered resource manager process requests a list of its assigned network elements. This request is dealt with by the OMC by performing a database query in the central information depository containing all the relevant information about network elements and assigned resource manager processes. One or more of such database queries are performed in step 33 in order to identify the network elements which are assigned to the newly launched resource manager process—if any.

In case of a restart of the resource manager process after a failure the system operation is restored this way in an efficient way without affecting the rest of the telecommunications system. In case a new resource manager process is added the list of network elements provided in step 33 may be empty initially.

In step 34 the list of assigned network elements is sent to the newly launched resource manager process in order to enable that resource manager process to start operation.

| list of reference numerals | |
|---|---|
| network element | 1 |
| resource manager | 2 |
| storage | 3 |
| operations maintenance center (OMC) | 4 |
| repository server | 5 |
| relational database | 6 |
| table | 7 |
| table | 8 |
| table | 9 |

-continued

| list of reference numerals | |
|---|---|
| registration program module | 10 |
| load balancing program module | 11 |
| database query module | 12 |
| notification module | 13 |
| configuration, fault, performance management modules | 14 |
| user interface | 15 |
| client computer | 16 |

The invention claimed is:

1. An operations and maintenance center for a telecommunications system comprising a plurality of network elements and a plurality of resource managers which are communicably linked to the network elements and the operations and maintenance center, the resource managers managing operations of the network elements, the operations and maintenance center comprising:
 a relational database which stores first information indicative of the network elements of the telecommunications system and second information indicative of assignments of network elements and resource; and
 means for assigning at least one of network elements to one of the resource managers and including information retrieval means for generating third information indicative of the at least one of the network elements being assigned to the one of the resource managers.

2. The operations and maintenance center of claim 1, wherein the information retrieval means is adapted to perform a query in the relational database means in order to generate the third information.

3. The operations and maintenance center of claim 1, wherein the server means a repository server of the telecommunications system.

4. The operations and maintenance center of claim 1, wherein the means for assigning the network elements comprises:
 means for determining a number of network elements assigned to each one of the resource managers;
 means for determining one of the resource managers having a minimal number of assigned network elements;
 means for assigning an additional network element to the one of the resource managers having the minimal number of network; and
 means for storing the assignment of the additional network element to the one of the resource managers as second information in the relational database.

5. A method for managing operations and maintenance of a telecommunications system at an operations and maintenance center, the telecommunications systems comprising a plurality of network elements and a plurality of resource managers which are communicably linked to the network elements and the operations and maintenance center, the resource managers managing operations of the network elements, the method comprising:
 storing of first information being indicative of network elements of the telecommunications system in a relational database of the operations and maintenance center;
 storing of second information being indicative of assignments of network elements and resource managers in the relational database of the operations and maintenance center; and
 assigning at least one of network elements to one of the resource managers and generating of third information being indicative of the at least one network elements being assigned to the one of the resource managers.

6. The method of claim 5, further comprising:
 inputting information regarding a new network element;
 determining a number of network elements assigned to each of the resource managers;
 determining one of the resource managers having a minimal number of network elements;
 assigning the additional network element to the one of the resource managers having the minimal number of assigned network elements; and
 storing of the assignment of the additional network element and the one of the resource managers as second information in the relational database.

7. The method of claim 5, further comprising:
 starting of one of the resource managers;
 requesting third information for the one of the resource managers;
 generating the requested third information by means of information retrieval from the relational database; and
 providing the requested third information to the one of the resource managers.

8. A computer program product for an operations and maintenance center of a telecommunications system which comprises a plurality of network elements and a plurality of resource managers which are communicably linked to the network elements and the operations and maintenance center, the resource managers managing operations of the network elements, the computer program product comprising:
 program means for storing in a relational database of the operations and maintenance center first information indicative of network elements of the telecommunications system and second information indicative of assignments of network elements and resource managers; and
 means for assigning at least one of the network elements to one of the resource managers and including data retrieval means for generating third information indicative of the at least one of network elements being assigned to the one of the resource manager processes.

* * * * *